United States Patent
Wang et al.

(10) Patent No.: US 7,139,036 B2
(45) Date of Patent: Nov. 21, 2006

(54) METHOD AND APPARATUS FOR IMAGE DETAIL ENHANCEMENT USING FILTER BANK

(75) Inventors: Xianglin Wang, Santa Ana, CA (US); Yeong-Taeg Kim, Irvine, CA (US)

(73) Assignee: Samsung Electronics Co., Ltd., Suwon (KR)

(*) Notice: Subject to any disclaimer, the term of this patent is extended or adjusted under 35 U.S.C. 154(b) by 678 days.

(21) Appl. No.: 10/355,721

(22) Filed: Jan. 31, 2003

(65) Prior Publication Data

US 2003/0112374 A1    Jun. 19, 2003

(51) Int. Cl.
*H04N 5/21* (2006.01)

(52) U.S. Cl. ..................................... 348/625

(58) Field of Classification Search ............... 348/625, 348/606, 607, 624, 627, 630; 382/254, 260, 382/261, 263, 265, 266, 275; *H04N 5/21, H04N 5/213*
See application file for complete search history.

(56) References Cited

U.S. PATENT DOCUMENTS

| | | | |
|---|---|---|---|
| 4,030,121 A | 6/1977 | Faroudja | |
| 5,001,573 A | 3/1991 | Sakamoto et al. | |
| 5,150,214 A * | 9/1992 | Shin et al. | 348/625 |
| 5,204,919 A | 4/1993 | Murakami | |
| 5,237,414 A | 8/1993 | Faroudja | |
| 5,400,084 A * | 3/1995 | Scarpa | 348/624 |
| 5,402,179 A * | 3/1995 | Okada | 348/607 |
| 5,446,503 A | 8/1995 | Sproule | |
| 6,983,076 B1 * | 1/2006 | Curry et al. | 382/260 |

* cited by examiner

*Primary Examiner*—Sherrie Hsia
(74) *Attorney, Agent, or Firm*—Kenneth L. Sherman, Esq.; Michael Zarrabian, Esq.; Myers Dawes Andras & Sherman, LLP

(57) ABSTRACT

An image detail enhancement method and apparatus that is suitable for different types of digital images, regardless of their signal frequency range or noise level. The detail enhancement apparatus has multiple filters termed, detail filter bank. A detail filter can be e.g. a high pass filter (HPF) or a band pass filter (BPF). In a detail filter bank, each detail filter has a pass band covering a specific frequency range and can therefore be used to obtain the detail signal in the corresponding frequency range from the original signal. The detail signals from those detail filters can then be processed before added back to the original signal as enhancements. This provides image detail enhancement that is suitable for different types of digital images (regardless of their signal frequency range or noise level).

64 Claims, 9 Drawing Sheets

METHOD AND APPARATUS FOR IMAGE DETAIL ENHANCEMENT USING FILTER BANK

FIELD OF THE INVENTION

The present invention relates to image detail enhancement, and in particular, to image detail enhancement to improve image sharpness.

BACKGROUND OF THE INVENTION

Improving image sharpness is important in image detail enhancement processing. FIG. 1 shows a system block diagram for a conventional image detail enhancement system 10 using a low pass filter (LPF) 12, which is typically known as "unsharp" filter. An input signal f (representing at least a portion of a video image formed by pixels), is processed and output as a signal g. The signal f is provided to the low pass filter (LPF) 12 to generate an unsharp signal $f_1$. Then the difference between the signals f and $f_1$ is determined in a difference junction/node 14, as a detail (difference) signal, $(f-f_1)$. The detail signal is then multiplied by a constant K (K>1) for enhancement in a multiplication junction/node 16, and summed with the signal f in a summing junction/node 18, to generate the output signal g. As such, the relationship between the output signal g and the input signal f can be expressed in the following equation:

$$g=(f-f_1)*K+f \quad (1)$$

In equation (1), the term $(f-f_1)*K$, is the detail enhancement term, and when there is a non-zero difference between the signals f and $f_1$, there are details which may be enhanced in the detail enhancement process.

However, the images to be enhanced may have different types of characteristics. Some images may contain rich high frequency, indicating many fine details or textures. Some other images may contain less high frequency, and so appear relatively smooth. Therefore, a problem with such a conventional detail enhancement system is that it is very difficult to design a LPF that can properly process different types of images with different characteristics. When the highest frequency of a signal is not much higher than the cutoff frequency of the LPF, the detail signal $f-f_1$ would be too weak to provide noticeable enhancement to the original signal. As a result, images containing less high frequency may be enhanced poorly by conventional systems.

In order to solve this problem, other methods using a few filters have been proposed. For example, in U.S. Pat. No. 5,001,573 ('573 patent) two LPFs are used to obtain two low passed versions of the original signal. The signal from the LPF with a lower cut-off frequency is termed as unsharp signal, U, the signal from the other LPF with a relatively higher cut-off frequency is termed as middle signal, M, and the original signal is denoted as S. According to that '573 patent, image detail enhancement depends on the difference signals S−U, M−U and S−M. The enhanced image signal ES can be expressed in a general form:

$$ES=S+k_1(S-M)+k_2(S-U)+k_3(M-U) \quad (2)$$

wherein $k_1$, $k_2$ and $k_3$ are all constant coefficients which may have either positive or negative values. If a constant coefficient takes a positive value, the corresponding difference signal is an enhanced term which is added to the original signal. If a constant coefficient takes a negative value, the corresponding difference signal is a suppressed term which is deducted from the original signal. A constant coefficient may also equal to zero if the corresponding difference signal is not taken into account in the detail enhancement process. The '573 patent also states some conditions about $k_1$, $k_2$ and $k_3$ that should be met for a detail enhancement system so that the high frequency component of the original image is always suppressed to eliminate granular noise while the mid frequency component of the original image is enhanced.

The '573 patent provides an extension of the traditional image detail enhancement system of FIG. 1. However, the invention in the '573 patent is too simplistic for the task of detail enhancement on different types of images available today. For example, with the introduction of digital TV, the quality of TV images may vary significantly. High definition images may have rich high frequency but very low level noise. In this case, the suppression of the high frequency component of the original image is not desirable because it simply degrades the image quality and introduces blurring. In another case, when a standard definition image is scaled up to fit a high definition TV screen, the scaled image may only have very low frequency component because of scaling. Therefore, even the LPF used for obtaining unsharp signal in the '573 patent may have too high a cut-off frequency for such images. As a result, the difference signals, S−U, M−U and S−M may all be too weak to bring any significant enhancement to the original image.

As such, there is a need for a practical image detail enhancement method and apparatus suitable for processing different types of digital images, regardless of their signal frequency range or noise level.

BRIEF SUMMARY OF THE INVENTION

The present invention addresses the above needs. An object of the present invention is to provide a practical image detail enhancement method and apparatus that is suitable for different types of digital images, regardless of their signal frequency range or noise level. As such, in one embodiment, the present invention provides a detail enhancement apparatus having multiple filters termed, detail filter bank. A detail filter can be e.g. a high pass filter (HPF) or a band pass filter (BPF). In a detail filter bank, each detail filter has a pass band covering a specific frequency range and can therefore be used to obtain the detail signal in the corresponding frequency range from the original signal. The detail signals from those detail filters can then be processed before added back to the original signal as enhancements. This provides image detail enhancement that is suitable for different types of digital images (regardless of their signal frequency range or noise level).

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Figure 1:
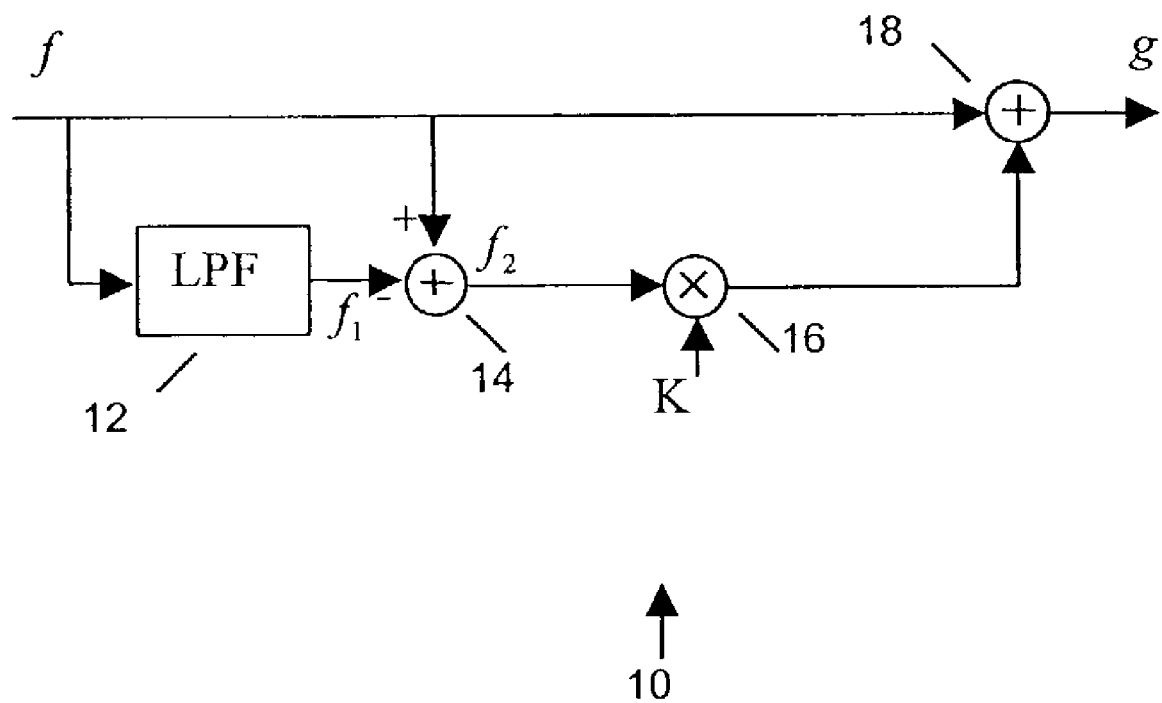
FIG. 1 shows a block diagram of a conventional detail enhancement system.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

As noted above, an object of the present invention is to provide a practical image detail enhancement method and apparatus that is suitable for different types of digital images, regardless of their signal frequency range or noise level. As such, in one embodiment, the present invention provides a detail enhancement apparatus having multiple filters termed, detail filter bank. A detail filter can be e.g. a high pass filter (HPF) or a band pass filter (BPF). In a detail filter bank, each detail filter has a pass band covering a specific frequency range and can therefore be used to obtain the detail signal in the corresponding frequency range from the original signal. The detail signals from those detail filters can then be processed before added back to the original signal as enhancements. This provides image detail enhancement that is suitable for different types of digital images (regardless of their signal frequency range or noise level).

For simplicity of description, and not limitation, the following description assumes that the data to be enhanced is in one dimension. However, the present invention presented herein is also applicable to two dimensional data as well with data being processed along each dimension separately.

Figure 2:
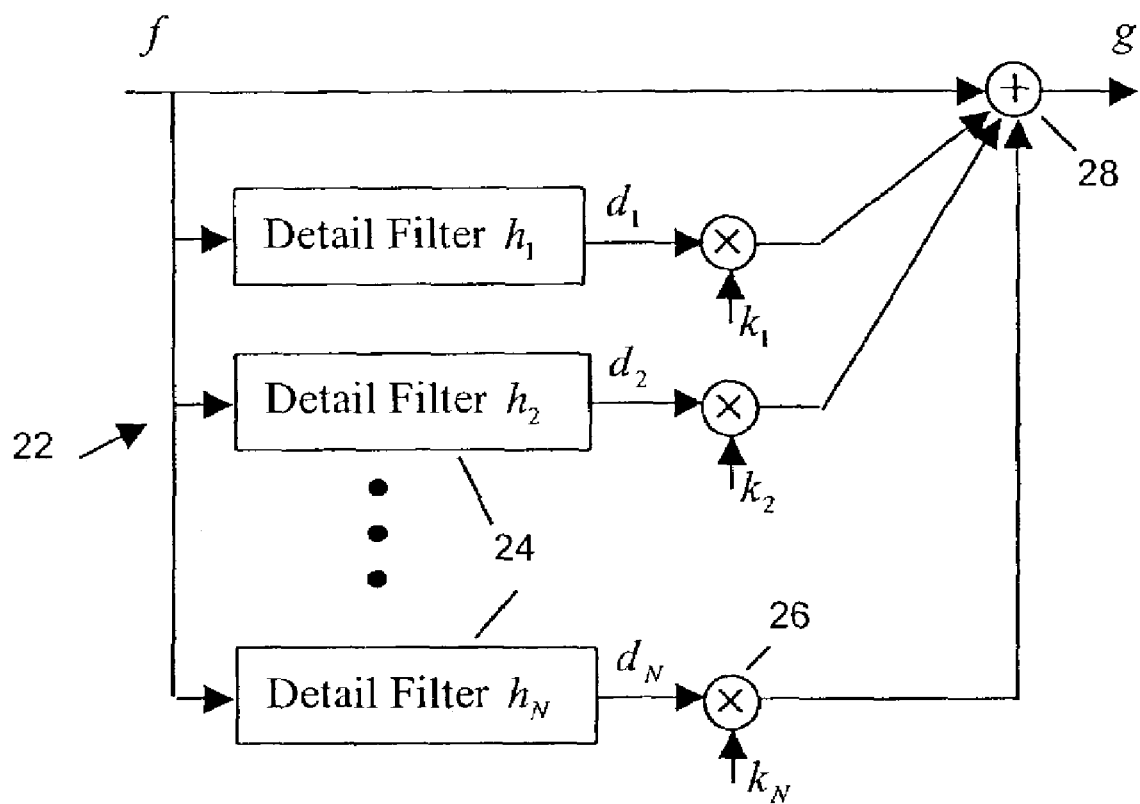
FIG. 2 shows a block diagram of an embodiment of a detail enhancement system according present invention using a bank of detail filters.

As mentioned, one or two filters may not be sufficient to provide a desired detail enhancement result for different types of images (e.g., in a digital TV system image characteristics may vary substantially). FIG. 2 shows a functional block diagram of said example detail enhancement system 20, according to the present invention. A detail filter bank 22 is used to extract the detail signals from the original signal f in different frequency ranges. The detail filter bank 22 includes multiple detail filters 24, wherein each detail filter 24 preferably comprises e.g. a high pass filter and/or a band pass filter. Other types of filters and/or combinations thereof, may also be used.

In the example shown in FIG. 2, N detail filters 24, designated as $h_1, h_2, \ldots, h_N$, respectively, are utilized, wherein each filter $h_i$ covers a specific frequency range. The original signal f is filtered through each detail filter $h_i$ as shown, wherein the corresponding filter output signal $d_i$ of each filter $h_i$ forms the detail signal corresponding to the frequency range of the pass band of filter $h_i$. Then each detail signal $d_i$ is combined with a corresponding gain coefficient $k_i$ (e.g., $d_i$ multiplied by $k_i$ in a corresponding multiply node 26 to generate $k_i d_i$). The nodes 26 form a first combiner. The detail signals are then combined with the original signal f to generate enhanced signal g (e.g., $k_i d_i$ summed with the signal f in a summation junction 28 to generate the signal g). The node 28 forms a second combiner. The relationship between the enhanced signal g and the original signal f can be expressed by example as:

$$g = f + \sum_{i=1}^{N} k_i d_i \qquad (3)$$

wherein $k_i$, i=1 ... N, are the gain coefficients, and $k_i \geq 0$.

When a filter $h_i$ is a finite impulse response (FIR) filter, the corresponding output $d_i$ can be expressed in a convolution form as:

$$d_i = f * h_i, \qquad (4)$$

wherein i=1 ... N, such that "*" represents the mathematical convolution operation.

Figure 3A:
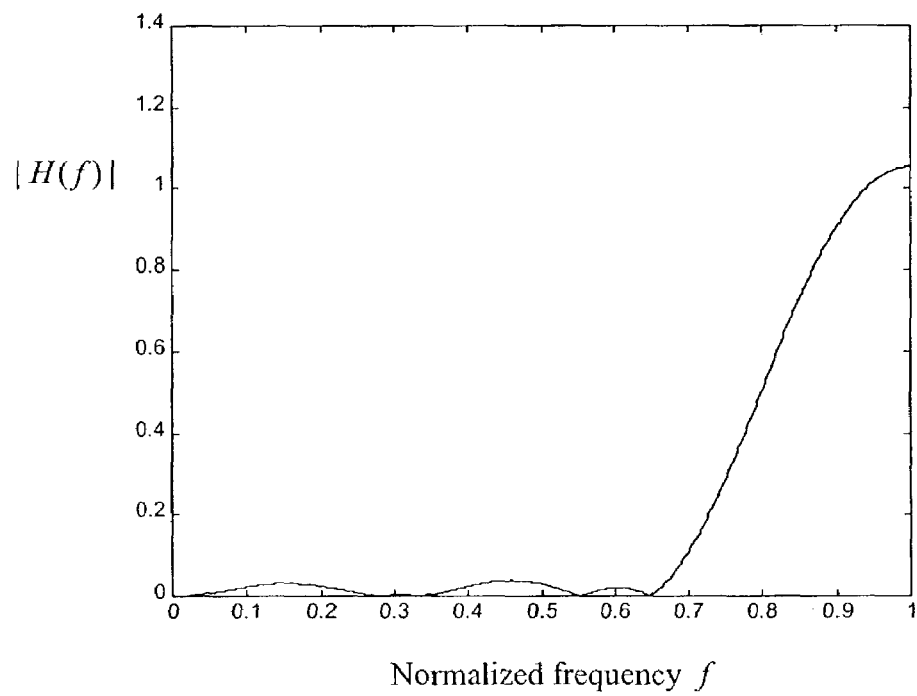
FIGS. 3A–3C show example frequency response plots for example detail filters for the filter bank in FIG. 2.
Figure 3B:
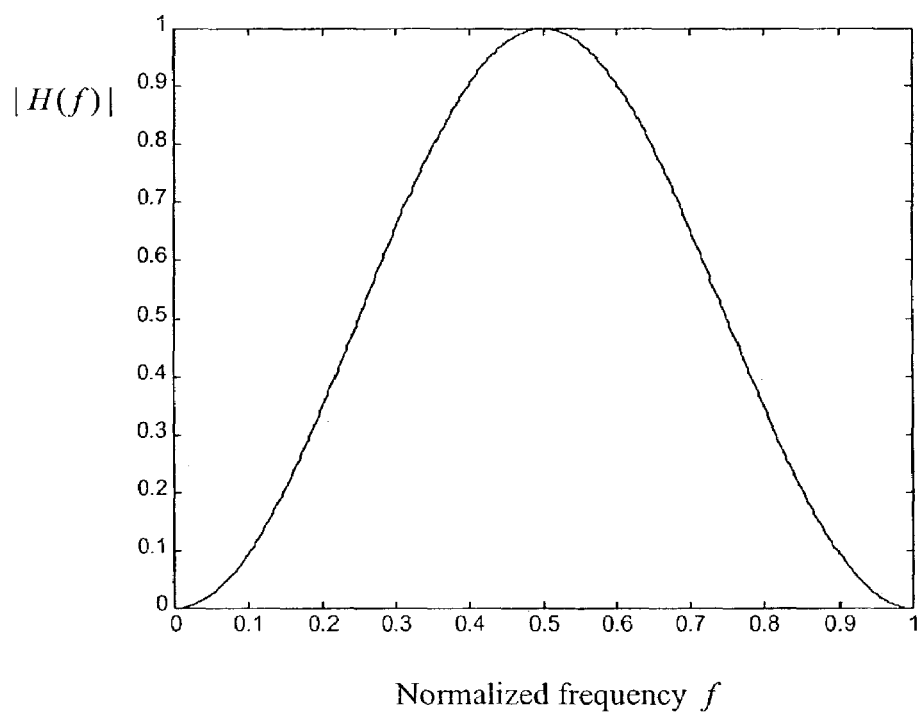
Figure 3C:
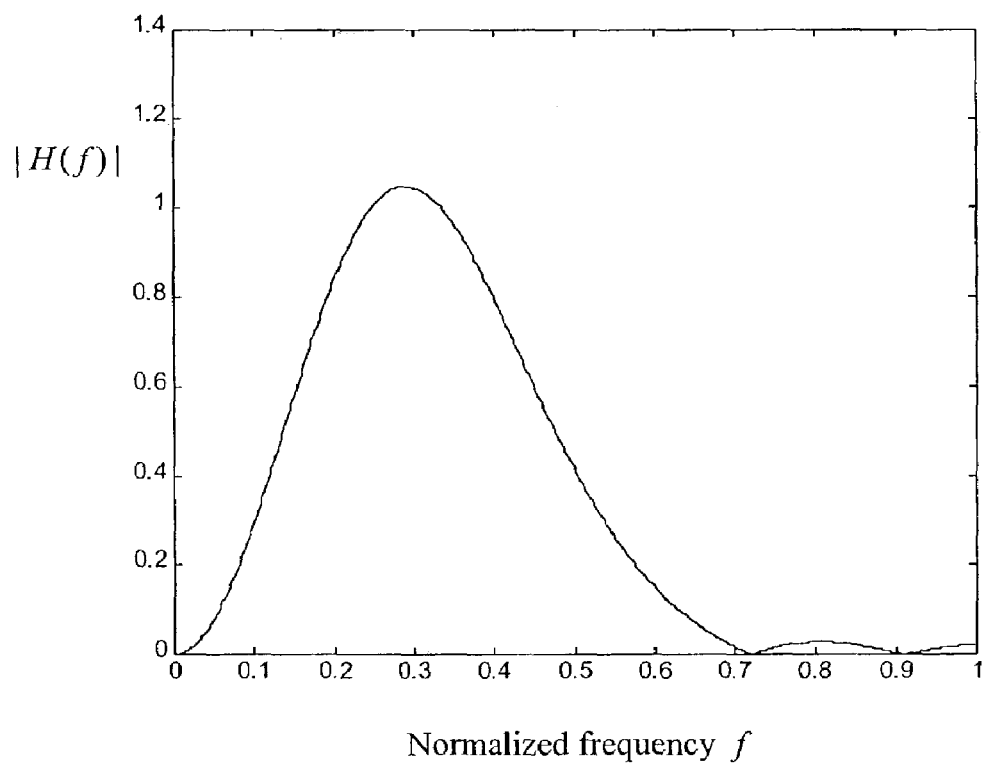

As an example of frequency response for a detail filter bank 22 according to the present invention, FIGS. 3A–C show the frequency responses of three suitable example detail filters 24 for the filter bank 22. In these figures, the horizontal axis represents normalized frequency, wherein for example, a frequency value of 1.0 corresponds to half the sample rate. The vertical axis represents the amplitude of frequency transfer function H(f). FIG. 3A shows a frequency response plot for a high pass detail filter. FIG. 3B shows a frequency response plot of a detail filter for a middle section of the frequency range of interest. And, FIG. 3C shows a frequency response plot for another band pass filter that covers an even lower section of the frequency range. The three example frequency responses in FIGS. 3A–C can be used as a detail filter bank 22 with each detail filter 24 targeting an essentially different section of the frequency range (some overlap between the different detail filters may be possible). Many other frequency response selections for the detail filters are possible and can be selected based on the enhancement results desired.

In most cases, detail filters 24 having frequency response plots such as shown in FIGS. 3A–B by example, may be efficient in extracting details from a signal f. However, for signals without much high frequency component, such as scaled up images, a detail filter 24 having a frequency response plot as in e.g. FIG. 3C, can help extract details in an even lower frequency range.

In conventional methods such as in patent '573, high frequency component of the original signal f is always suppressed instead of being enhanced because of the concern for noise. By contrast, according the present invention, essentially no frequency component of the original signal f is suppressed. This is achieved with a restriction on the gain coefficients where $k_i \geq 0$ in equation (3). When $k_i > 0$, there is enhancement in the corresponding frequency range of the pass band of a detail filter $h_i$. When $k_i = 0$, there is essentially no enhancement of the original signal f in the detail filter $h_i$.

Therefore, for a detail signal $d_i$ which may contain substantial noise, one method of preventing noise from enhancement, is to simply set the gain value $k_i$ to zero so that essentially there is no enhancement in that frequency range. Alternatively, a noise reduction process may be performed prior to image detail enhancement.

According to this embodiment of the present invention, the requirement for each $k_i$ is that $k_i \geq 0$ so that essentially no frequency range is explicitly suppressed. Suppression of a certain frequency range can cause blurring, which is undesirable for image enhancement. This is especially true for high definition images that may contain rich high frequency but very low noise.

In image enhancement processing, when enhancement values with large amplitudes are used directly and added back to the original image, the enhanced image often looks unnatural, which is because some high frequency areas in the image are so overly enhanced. However, this problem can not be fully solved by simply lowering the values of gain coefficients $k_i$. According to equation (3), when $k_i$ is lowered, all enhancement values are linearly scaled down. When amplitude values are no longer so large to result in an unnatural looking image, the majority of the normal enhancement values may become too small to produce any effective enhancement to the original image. This problem may occur especially in images with very sharp edges or fine details where a few very large amplitude enhancement values may exist.

Figure 4:
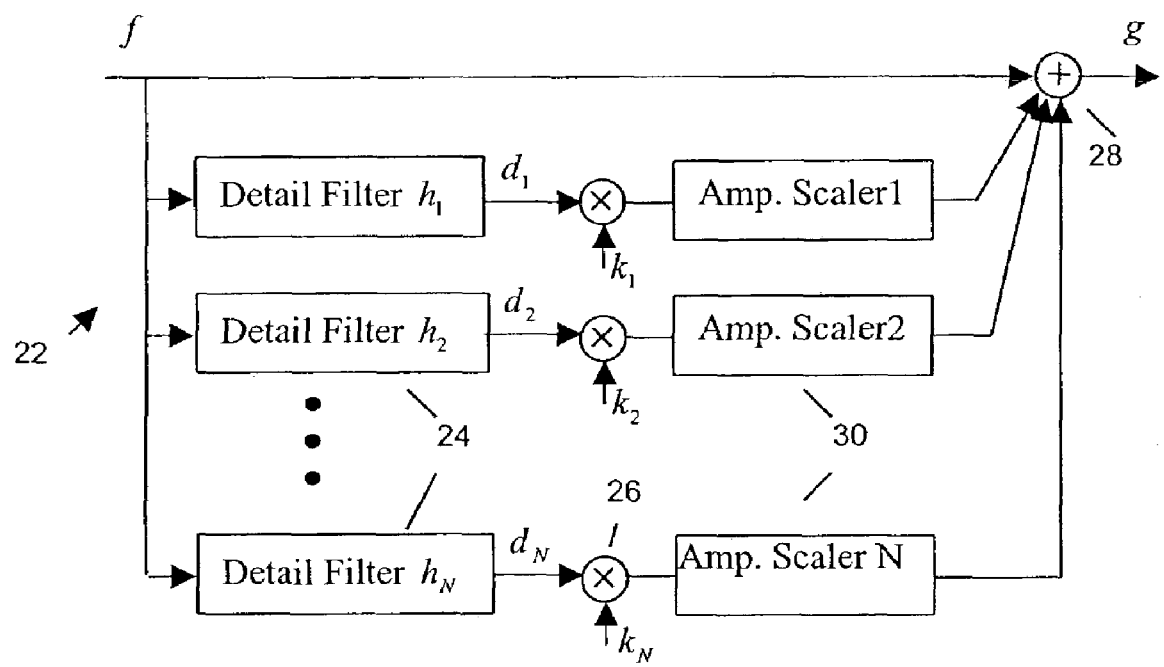
FIG. 4 shows a block diagram of another embodiment of a detail enhancement system according present invention using a bank of detail filters, and amplitude scaler.

As such, FIG. 4 shows a functional block diagram of another embodiment of the detail enhancement system 20 according to the present invention, further including an amplitude scaler 30 for each detail signal $d_i$ before it is added back to the original signal f as an enhancement. In this embodiment, the relationship between the enhanced signal g and the original signal f can be expressed by example as:

$$g = f + \sum_{i=1}^{N} \text{scaler}(k_i d_i) \quad (5)$$

wherein $k_i$ and $d_i$ are the same as that in equation (3), and the function scaler ( ) denotes the processing performed by each amplitude scaler 30 in FIG. 4. Each scaler 30 scales down those enhancement values with amplitudes higher than a certain threshold (further, each scaler 30 may perform a different scaling function).

The desired result from the amplitude scaler 30 is that larger amplitude values should be scaled down more than smaller amplitude values. However, after scaling, originally smaller amplitude values should still have smaller amplitudes than those originally larger amplitude values. Example equations (6) and (7) below express this requirement more clearly for the case of positive enhancement values $x_j$:

$$0 < \text{scaler}(x_1) < \text{scaler}(x_2) \text{ for } 0 < x_1 < x_2 \quad (6)$$

$$0 < x_1 - \text{scaler}(x_1) < x_2 - \text{scaler}(x_2) \text{ for } 0 < x_1 < x_2. \quad (7)$$

This scaling is preferably symmetrical with reference to the origin (0, 0). As such, once the scaler(x) function is defined for $x \geq 0$, negative values can be scaled as:

$$\text{scaler}(x) = -\text{scaler}(-x) \text{ for } x < 0. \quad (8)$$

Therefore, the scaler(x) function needs to be defined only for $x \geq 0$.

To satisfy equations (6) and (7) above, a logarithmic function can serve as the scaling function. As x is the amplitude of an enhancement value, $x \geq 0$, a scaling function can be defined as:

$$\text{scaler}(x) = \begin{cases} \min(x, C \ln(x)) & \text{if } x > 1 \\ 0 & \text{if } 0 \leq x \leq 1 \end{cases} \quad (9)$$

wherein C is a constant, C>0. Equation (9) essentially satisfies the conditions in equations (6) and (7) for most positive values. The value of constant C, can be selected based on the data dynamic range of x and the expected data dynamic range of scaled x. In one example, if the maximum value for x in equation (9) is M and the expected maximum value for x after scaling is N, the C can be determined according to the relation: $C=N/\ln(M)$.

Figure 5:
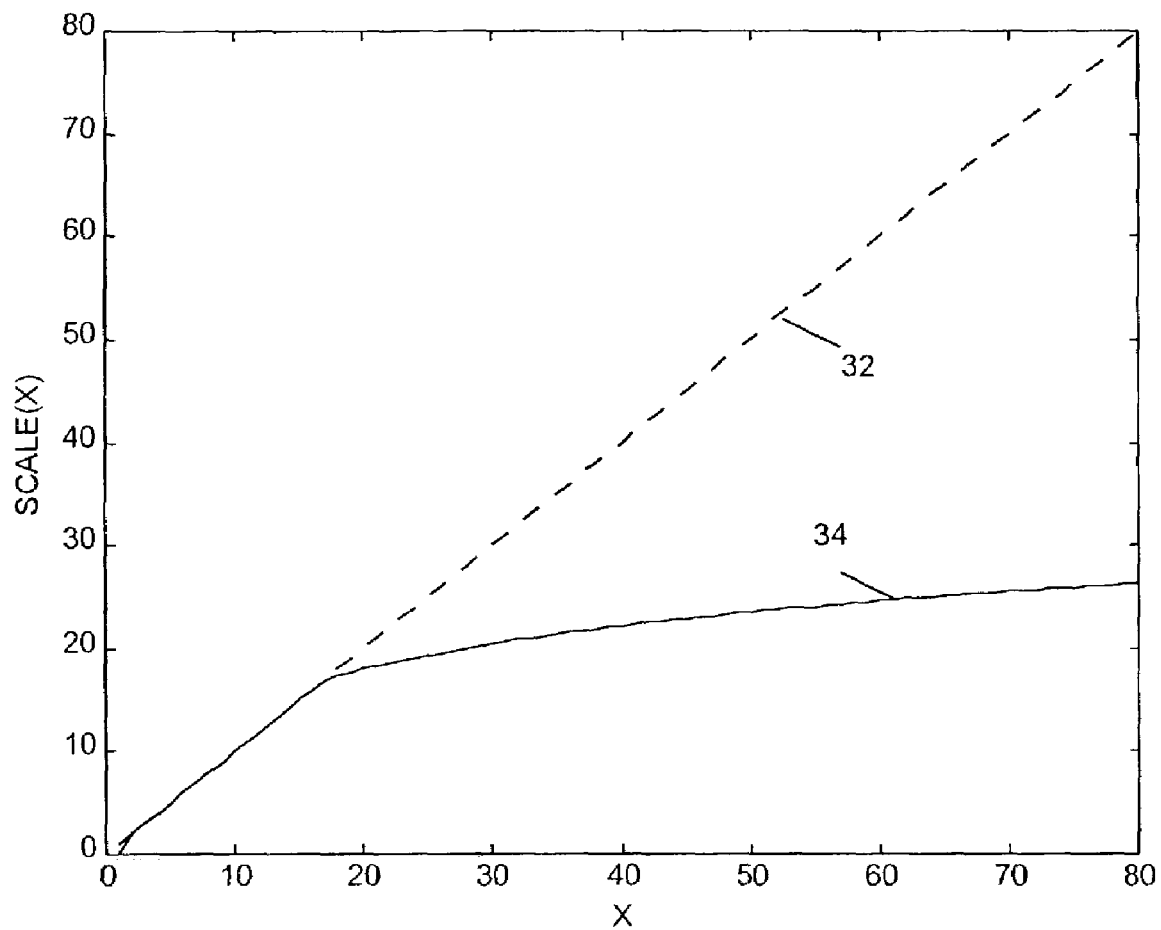
FIG. 5 shows an example plot of amplitude scaling results.

FIG. 5 shows an example of the scaling function. In the example, assuming the image luminance has 256 levels that from 0 to 255, the horizontal axis shows the enhancement value x (represented by a detail signal d) before scaling. The dynamic range is about 0~80. As such, an enhancement value of 80 is too large for the original image without scaling. If the expected data dynamic range for the scaled x is about 0~27, then C can be determined as $C=27/\ln(80) \approx 6$. The vertical axis shows the value x after scaling. The curve 32 shown by broken lines in FIG. 5, is for the case of no scaling. The curve 34 with solid line is for the case of scaling according to equation (9) with C=6.0. It shows that for enhancement value x between about 0 and 80, the scaled values fall between about 0 and 27.

Using the scaling function provided in a scaler 30 according to equation (9), the dynamic range of enhancement values x can be effectively reduced so to prevent the processed image from being overly enhanced and looking unnatural. And, because the scaling is performed in a nonlinear fashion and smaller amplitude values are less affected by the scaler, most image details are still well enhanced. The amplitude scaler 30 can also be implemented in a piecewise linear manner by being approximated with a piecewise linear curve.

Figure 6:
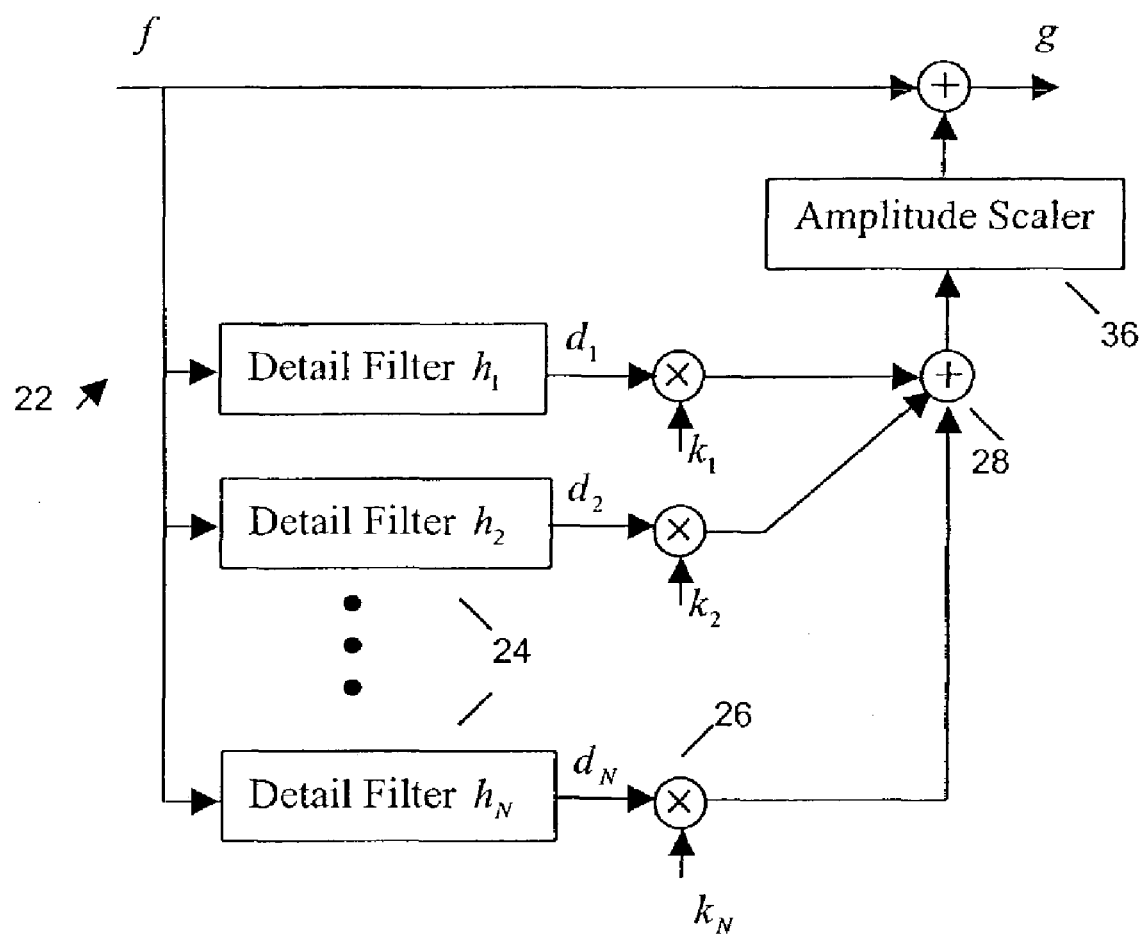
FIG. 6 shows a block diagram of yet another embodiment of a detail enhancement system according present invention using a bank of detail filters, and amplitude scaler.

FIG. 6 shows a functional block diagram of another embodiment of the detail enhancement system 20, utilizing an amplitude scaler 36. In the example system shown in FIG. 6, the relationship between the enhanced signal g and the original signal f can be expressed by example as:

$$g = f + \text{scaler}\left(\sum_{i=1}^{N} k_i d_i\right) \quad (10)$$

The amplitude scaler 36 and function scaler ( ), are essentially as described above in relation to the amplitude scaler 30. However, the system 20 of FIG. 6 provides a simpler configuration than that in FIG. 4 because only one amplitude scaler is used. Another advantage of the system in FIG. 6 is that the dynamic range of the overall enhancement signal is easier to control than that in FIG. 4.

Figure 7A:
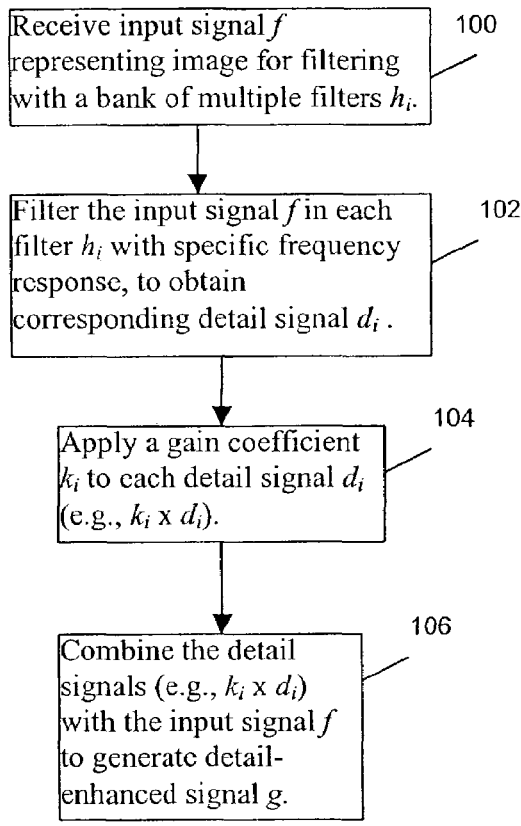
FIG. 7A shows a flowchart of steps in an embodiment of a method of image detail enhancement according to the present invention.
Figure 7B:
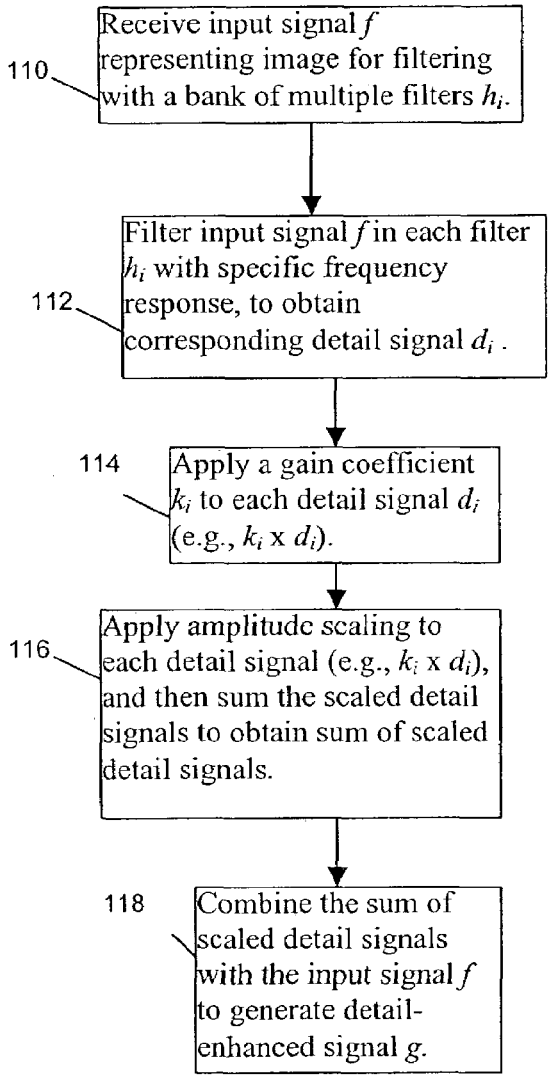
FIG. 7B shows a flowchart of steps in another embodiment of a method of image detail enhancement according to the present invention.
Figure 7C:
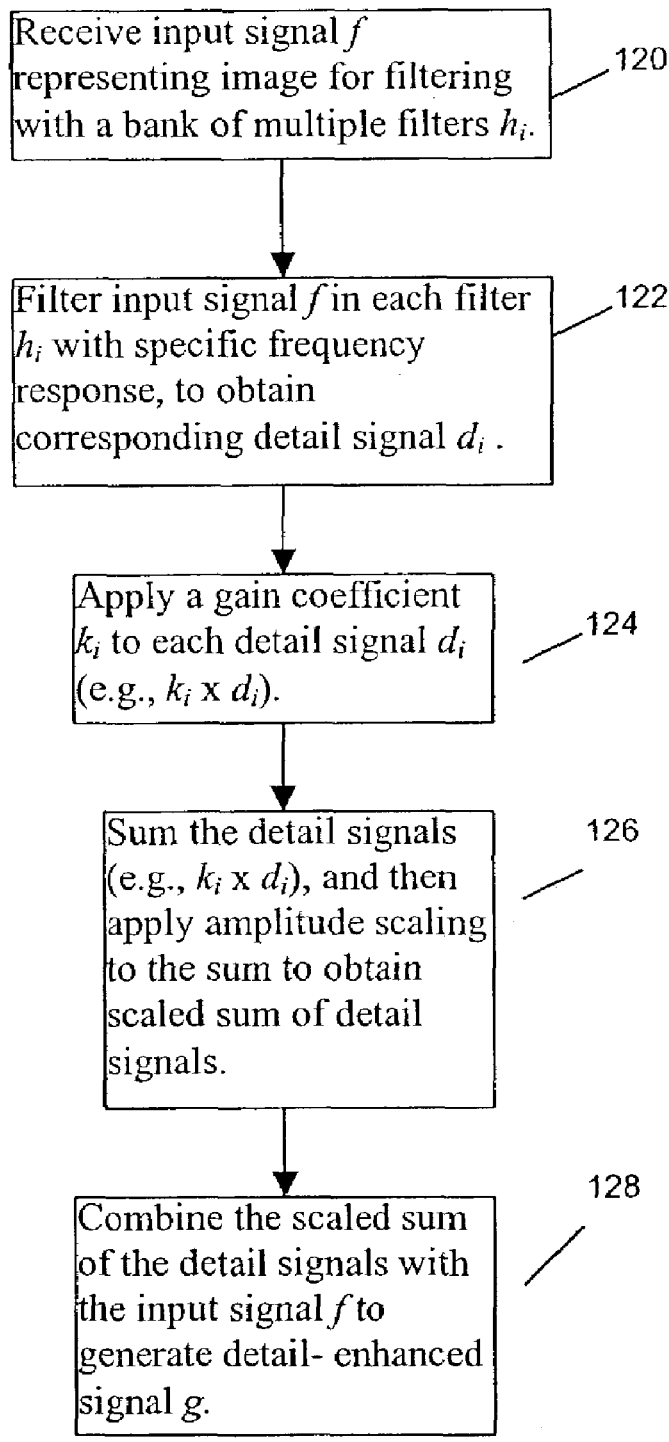
FIG. 7C shows a flowchart of steps in yet another embodiment of a method of image detail enhancement according to the present invention

FIGS. 7A–C show flowcharts of different embodiments of a method of detail enhancement according to the present invention, corresponding to the function of the different system embodiments described above. Referring to FIG. 7A, in a first embodiment, the method of the present invention includes the steps of: Receiving the input signal f, for filtering in each detail filter in a bank of filters $h_i$, wherein each detail filter $h_i$ has a specific frequency response (step 100); filtering the input signal f with each filter $h_i$ to obtain a corresponding detail signal $d_i$ (step 102); applying a gain coefficient $k_i$ to each detail signal $d_i$, wherein the gain coefficient applied to each detail signal may be different than others (step 104); and combining the detail signals (e.g., $k_i \times d_i$) with the input signal f to obtain the detail-enhanced signal g (e.g., equation 3 above) (step 106).

Referring to FIG. 7B, in another embodiment, the method of the present invention includes the steps of: Receiving the input signal f, for filtering in each filter of a bank of filters $h_i$, wherein each filter $h_i$ has a specific frequency response (step 110); filtering the input signal f with each filter $h_i$ to obtain a corresponding detail signal $d_i$ (step 112); applying a gain coefficient $k_i$ to each detail signal $d_i$ (step 114); applying amplitude scaling to each detail signal (e.g., $k_i \times d_i$) to obtain a corresponding scaled signal (e.g., scaler($k_i \times d_i$)), and summing the scaled detail signals (step 116); and then combining the sum of scaled detail signals with the input signal f to obtain the detail-enhanced signal g (e.g., equation 5 above) (step 118).

Referring to FIG. 7C, in yet another embodiment, the method of the present invention includes the steps of: Receiving the input signal f, for filtering in each filter of a bank of filters $h_i$, wherein each filter $h_i$ has a specific frequency response (step 120); filtering the input signal f with each filter $h_i$ to obtain a corresponding detail signal $d_i$ (step 122); applying a gain coefficient $k_i$ to each detail signal $d_i$ (step 124); summing the detail signals, and then applying amplitude scaling to the sum of detailed signals to obtain a scaled sum of the detail signal (step 126); and then combining the scaled sum of detail signals with the input signal f to obtain the detail-enhanced signal g (e.g., equation 10 above) (step 128).

As such, in one embodiment, the present invention provides an apparatus for image detail enhancement based on a detail filter bank, wherein the detail filter bank includes a group of detail filters with each filter covering a specific frequency range. Such a detail filter can therefore be used to obtain the detail signal in the corresponding frequency range from the original signal. The detail signals from the detail filters can then be multiplied by selected gain coefficients for selective enhancement, before being added back to the original signal as enhancements. In another embodiment, the present invention provides an image detail enhancement apparatus using a detail filter bank, wherein further an amplitude scaler is also applied to each detail signal so that large amplitude enhancement values can be effectively scaled down before they are added back to the original signal as enhancements. Yet in another embodiment of the present invention, an overall amplitude scaler is applied to the summation of all the detail signals so that big amplitude enhancement values can be effectively scaled down before they are added back to the original signal as enhancements. The amplitude scaler is preferably used to scale down detail enhancement values before they are applied to the original signal as enhancements in a non-linear or piecewise linear manner. Accordingly, the present invention provides an image detail enhancement method and apparatus suitable for processing different types digital images, regardless of their signal frequency range or noise level.

The aforementioned apparatus/system according to the present invention, can be implemented as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for image detail enhancement, comprising the steps of:
    filtering an input signal f representing an image, through each of a plurality of filters, wherein the output of each filter forms a detail signal representing an enhancement;
    each filter having a frequency response covering a selected frequency range;
    combining the detail signals from the filters with the input signal to generate an enhanced signal g representing a detail enhanced image.

2. The method of claim 1, wherein each filter has a frequency range essentially different than that of the other filters, such that essentially no frequency component of the original signal f is suppressed.

3. The method of claim 1, wherein one or more of the filters is a high pass filter.

4. The method of claim 1, wherein one or more of the filters is a band pass filter.

5. The method of claim 1, further comprising the steps of multiplying each detail signal by a gain coefficient before combining the details signals with the input signal as enhancements, such that essentially no frequency component of the original signal f is suppressed.

6. The method of claim 1, further comprising the steps of multiplying each detail signal by a gain coefficient before combining the details signals with the input signal as enhancements.

7. The method of claim 6, wherein the relationship between the enhanced signal g and the input signal f is according to the relation:

$$g = f + \sum_{i=1}^{N} k_i d_i,$$

wherein N is the number of filters; $d_i$, i=1 ... N, are corresponding detail signals; and $k_i$, i=1 ... N, are the corresponding gain coefficients, $k_i > 0$.

8. The method of claim 7, wherein each detail signal $d_i$ is obtained by filtering the input signal f with a FIR filter $h_i$, wherein $d_i = f * h_i$, in a convolution form.

9. A method for image detail enhancement, comprising the steps of:
    filtering an input signal f representing an image, through each of a plurality of filters, wherein the output of each filter forms a detail signal representing an enhancement;
    applying an amplitude scaler to each detail signal so that amplitude enhancement values above a threshold in each detail signal is essentially scaled down;
    combining the scaled down detail signals with the input signal to generate an enhanced signal g representing a detail enhanced image.

10. The method of claim 9, wherein each filter has a frequency range essentially different than that of the other filters.

11. The method of claim 9, wherein one or more of the filters is a high pass filter.

12. The method of claim 9, wherein one or more of the filters is a band pass filter.

13. The method of claim 9, wherein each filter covers a selected frequency range such that the associated output detail signal is in the corresponding frequency range from the input signal.

14. The method of claim 9, further comprising the steps of multiplying each detail signal by a gain coefficient before combining the details signals with the input signal as enhancements.

15. The method of claim 14, wherein the relationship between the enhanced signal g and the input signal f is according to the relation:

$$g = f + \sum_{i=1}^{N} \text{scaler}(k_i d_i),$$

wherein N is the number of filters; $d_i$, i=1 ... N, are corresponding detail signals; $k_i$, i=1 ... N, are the corresponding gain coefficients, $k_i > 0$; and scaler ( ) is an amplitude scaling function.

16. The method of claim 15, wherein each detail signal $d_i$ is obtained by filtering the input signal f with a FIR filter $h_i$, wherein $d_i = f * h_i$ in a convolution form.

17. The method of claim 15, wherein the amplitude scaling function scaler ( ) is essentially a non-linear function.

18. The method of claim 17, wherein the amplitude scaling function scaler ( ) is according to the relations:

scaler(x)=−scaler(−x) for x<0; and for positive x values, the amplitude scaling function scaler ( ) is according to the relation:

$$\text{scaler}(x) = \begin{cases} \min(x, C\ln(x)) & \text{if } x > 1 \\ 0 & \text{if } 0 \leq x \leq 1 \end{cases}$$

wherein C is a constant, C>0.

19. The method of claim 15, wherein the amplitude scaling function is essentially a piecewise linear function.

20. The method of claim 15, wherein the scaling function scaler ( ) is a piecewise linear function approximating a function according to relations:

scaler(x)=−scaler(−x) for x<0; and for positive x values, the amplitude scaling function scaler ( ) is according to the relation:

$$\text{scaler}(x) = \begin{cases} \min(x, C\ln(x)) & \text{if } x > 1 \\ 0 & \text{if } 0 \leq x \leq 1 \end{cases}$$

wherein C is a constant, C>0.

21. A method for image detail enhancement, comprising the steps of:
filtering an input signal f representing an image, through each of a plurality of filters, each filter having a specific frequency response covering a frequency range, wherein the output of each filter forms a detail signal representing an enhancement;
combining the detail signals;
applying an amplitude scaler to the combination of the detail signal so that amplitude enhancement values above a threshold in the combined detail signal is essentially scaled down;
combining the scaled down detail signal with the input signal to generate an enhanced signal g representing a detail enhanced image.

22. The method of claim 21, wherein each filter has a frequency response covering a frequency range essentially different than that of the other filters.

23. The method of claim 21, wherein one or more of the filters is a high pass filter.

24. The method of claim 21, wherein one or more of the filters is a band pass filter.

25. The method of claim 21, wherein each filter covers a selected frequency range such that the associated output detail signal is in the corresponding frequency range from the input signal.

26. The method of claim 21, further comprising the steps of multiplying each detail signal by a gain coefficient before combining the details signals with the input signal as enhancements.

27. The method of claim 26, wherein the relationship between the enhanced signal g and the input signal f is according to the relation:

$$g = f + \text{scaler}\left(\sum_{i=1}^{N} k_i d_i\right),$$

wherein N is the number of filters; $d_i$, i=1 ... N, are corresponding detail signals; $k_i$, i=1 ... N, are the corresponding gain coefficients, $k_i > 0$; and scaler ( ) is an amplitude scaling function.

28. The method of claim 27, wherein each detail signal $d_i$ is obtained by filtering the input signal f with a FIR filter $h_i$, wherein $d_i = f * h_i$ in a convolution form.

29. The method of claim 27, wherein the amplitude scaling function scaler ( ) is essentially a non-linear function.

30. The method of claim 29, wherein the amplitude scaling function scaler ( ) is according to the relations:

scaler(x)=−scaler(−x) for x<0; and for positive x values, the amplitude scaling function scaler ( ) is according to the relation:

$$\text{scaler}(x) = \begin{cases} \min(x, C\ln(x)) & \text{if } x > 1 \\ 0 & \text{if } 0 \leq x \leq 1 \end{cases}$$

wherein C is a constant, C>0.

31. The method of claim 27, wherein the amplitude scaling function is essentially a piecewise linear function.

32. The method of claim 27, wherein the scaling function scaler ( ) is a piecewise linear function approximating a function according to relations:

scaler(x)=−scaler(−x) for x<0; and for positive x values, the amplitude scaling function scaler ( ) is according to the relation:

$$\text{scaler}(x) = \begin{cases} \min(x, C\ln(x)) & \text{if } x > 1 \\ 0 & \text{if } 0 \leq x \leq 1 \end{cases}$$

wherein C is a constant, C>0.

33. An image detail enhancement system, comprising:
a bank of filters comprising a plurality of filters, each filter having a frequency response covering a frequency range, for filtering an input signal f representing an image, through each of the plurality of filters, wherein the output of each filter forms a detail signal representing an enhancement; and
a combiner that combines the detail signals from the filters with the input signal to generate an enhanced signal g representing a detail enhanced image.

34. The system of claim 33, wherein each filter has a frequency response covering a frequency range essentially different than that of the other filters, such that essentially no frequency component of the original signal f is suppressed.

35. The system of claim 33, wherein one or more of the filters is a high pass filter.

36. The system of claim 33, wherein one or more of the filters is a band pass filter.

37. The system of claim 33, wherein the combiner further multiplies each detail signal by a gain coefficient before combining the details signals with the input signal as enhancements, such that essentially no frequency component of the original signal f is suppressed.

38. The system of claim 33, wherein the combiner further multiplies each detail signal by a gain coefficient before combining the details signals with the input signal as enhancements.

39. The system of claim 38, wherein the relationship between the enhanced signal g and the input signal f is according to the relation:

$$g = f + \sum_{i=1}^{N} k_i d_i,$$

wherein N is the number of filters; $d_i$, i=1 . . . N, are corresponding detail signals; and $k_i$, i=1 . . . N, are the corresponding gain coefficients, $k_i > 0$.

40. The system of claim 39, wherein each detail signal $d_i$ is obtained by filtering the input signal f with a FIR filter $h_i$, wherein $d_i = f*h_i$ in a convolution form.

41. An image detail enhancement system, comprising:
a bank of filters for filtering an input signal f representing an image, through each filter, wherein the output of each filter forms a detail signal representing an enhancement;
an amplitude scaler that scales each detail signal so that amplitude enhancement values above a threshold in each detail signal is essentially scaled down;
a combiner that combines the scaled down detail signals with the input signal to generate an enhanced signal g representing a detail enhanced image.

42. The system of claim 41, wherein each filter has a frequency range essentially different than that of the other filters.

43. The system of claim 41, wherein one or more of the filters is a high pass filter.

44. The system of claim 41, wherein one or more of the filters is a band pass filter.

45. The system of claim 41, wherein each filter covers a selected frequency range such that the associated output detail signal is in the corresponding frequency range from the input signal.

46. The system of claim 41, wherein the combiner further multiplies each detail signal by a gain coefficient before combining the details signals with the input signal as enhancements.

47. The system of claim 46, wherein the relationship between the enhanced signal g and the input signal f is according to the relation:

$$g = f + \sum_{i=1}^{N} \text{scaler}(k_i d_i),$$

wherein N is the number of filters; $d_i$, i=1 . . . N, are corresponding detail signals; $k_i$, i=1 . . . N, are the corresponding gain coefficients, $k_i > 0$; and scaler ( ) is an amplitude scaling function of the amplitude scaler.

48. The system of claim 47, wherein each detail signal $d_i$ is obtained by filtering the input signal f with a FIR filter $h_i$, wherein $d_i = f*h_i$ in a convolution form.

49. The system of claim 47, wherein the amplitude scaling function scaler ( ) is essentially a non-linear function.

50. The system of claim 49, wherein the amplitude scaling function scaler ( ) is according to the relations:

$$\text{scaler}(x) = -\text{scaler}(-x) \text{ for } x > 0; \text{ and}$$

for positive x values, the amplitude scaling function scaler ( ) is according to the relation:

$$\text{scaler}(x) = \begin{cases} \min(x, C\ln(x)) & \text{if } x > 1 \\ 0 & \text{if } 0 \leq x \leq 1 \end{cases}$$

wherein C is a constant, C>0.

51. The system of claim 47, wherein the amplitude scaling function is essentially a piecewise linear function.

52. The system of claim 47, wherein the scaling function scaler ( ) is a piecewise linear function approximating a function according to relations:

$$\text{scaler}(x) = -\text{scaler}(-x) \text{ for } x < 0; \text{ and}$$

for positive x values, the amplitude scaling function scaler ( ) is according to the relation:

$$\text{scaler}(x) = \begin{cases} \min(x, C\ln(x)) & \text{if } x > 1 \\ 0 & \text{if } 0 \leq x \leq 1 \end{cases}$$

wherein C is a constant, C>0.

53. An image detail enhancement system, comprising:
a bank of filters for filtering an input signal f representing an image through each of the filters, each filter having a specific frequency response covering a frequency range, wherein the output of each filter forms a detail signal representing an enhancement;
a first combiner for combining the detail signals;
an amplitude scaler that scales combination of the detail signal so that amplitude enhancement values above a threshold in the combined detail signal is essentially scaled down;
a second combiner that combines the scaled down detail signal with the input signal to generate an enhanced signal g representing a detail enhanced image.

54. The system of claim 53, wherein each filter has a frequency response covering a frequency range essentially different than that of the other filters.

55. The system of claim 53, wherein one or more of the filters is a high pass filter.

56. The system of claim 53, wherein one or more of the filters is a band pass filter.

57. The system of claim 53, wherein each filter covers a selected frequency range such that the associated output detail signal is in the corresponding frequency range from the input signal.

58. The system of claim 53, wherein the first combiner further multiplies each detail signal by a gain coefficient before combining the details signals with the input signal as enhancements.

59. The system of claim 58, wherein the relationship between the enhanced signal g and the input signal f is according to the relation:

$$g = f + \text{scaler}\left(\sum_{i=1}^{N} k_i d_i\right),$$

wherein N is the number of filters; $d_i$, i=1 ... N, are corresponding detail signals; $k_i$, i=1 ... N, are the corresponding gain coefficients, $k_i$>0; and scaler ( ) is an amplitude scaling function of the amplitude scaler.

60. The system of claim 59, wherein each detail signal $d_i$ is obtained by filtering the input signal f with a FIR filter $h_i$, wherein $d_i$=f*$h_i$ in a convolution form.

61. The system of claim 59, wherein the amplitude scaling function scaler ( ) is essentially a non-linear function.

62. The system of claim 61, wherein the amplitude scaling function scaler ( ) is according to the relations:

scaler(x)=−scaler(−x) for x<0; and for positive x values, the amplitude scaling function scaler ( ) is according to the relation:

$$\text{scaler}(x) = \begin{cases} \min(x, C\ln(x)) & \text{if } x > 1 \\ 0 & \text{if } 0 \leq x \leq 1 \end{cases}$$

wherein C and a are constants, C>0.

63. The system of claim 59, wherein the amplitude scaling function is essentially a piecewise linear function.

64. The system of claim 59, wherein the scaling function scaler ( ) is a piecewise linear function approximating a function according to relations:

scaler(x)=−scaler(−x) for x<0; and for positive x values, the amplitude scaling function scaler ( ) is according to the relation:

$$\text{scaler}(x) = \begin{cases} \min(x, C\ln(x)) & \text{if } x > 1 \\ 0 & \text{if } 0 \leq x \leq 1 \end{cases}$$

wherein C is a constant, C>0.

* * * * *